Oct. 11, 1932.    C. P. WELLMAN    1,882,049
ART OF MAKING LINED RECEPTACLES
Original Filed July 7, 1919    2 Sheets-Sheet 1
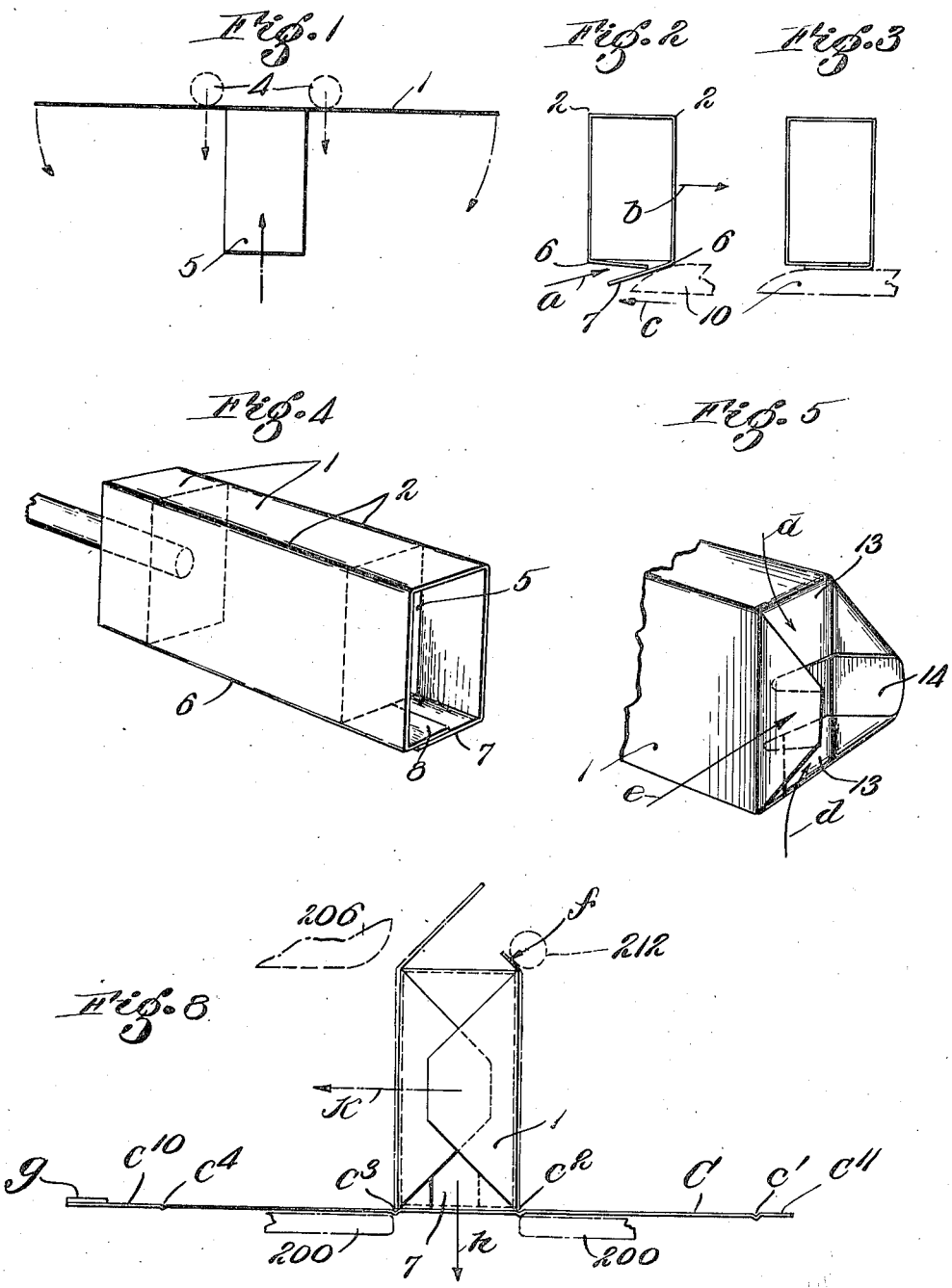

Oct. 11, 1932.  C. P. WELLMAN  1,882,049
ART OF MAKING LINED RECEPTACLES
Original Filed July 7, 1919  2 Sheets-Sheet 2
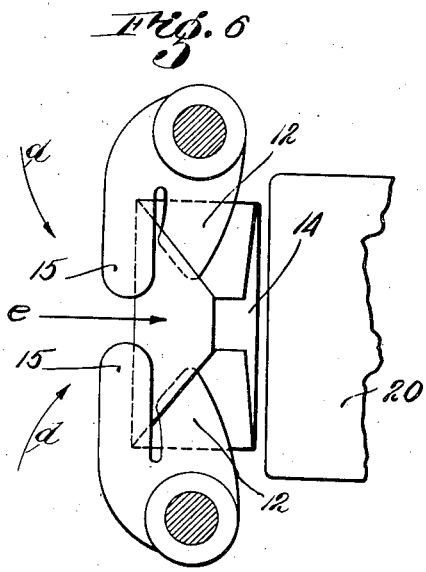
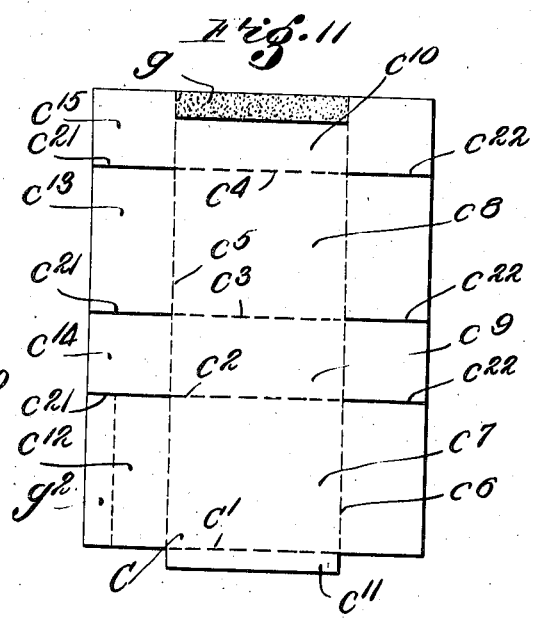
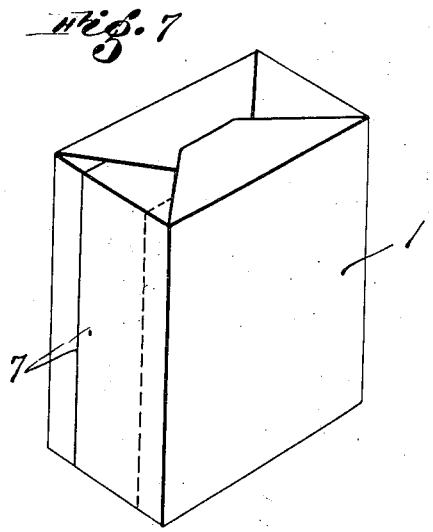
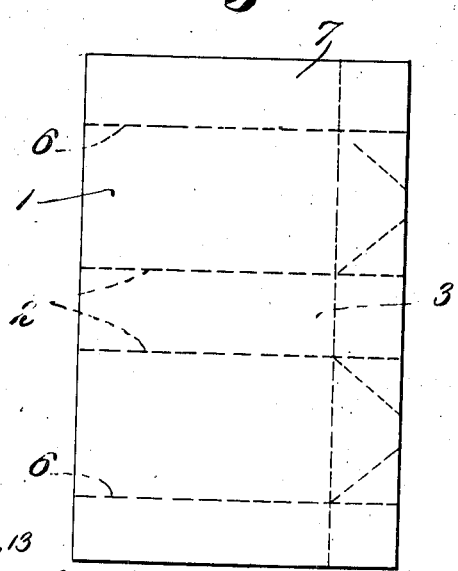
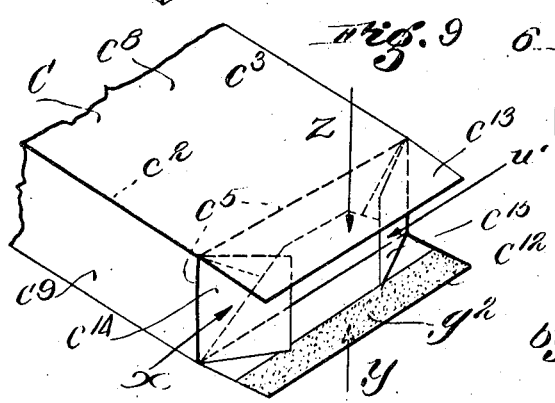

Patented Oct. 11, 1932

1,882,049

UNITED STATES PATENT OFFICE

CHARLES P. WELLMAN, OF MEDFORD, MASSACHUSETTS, ASSIGNOR TO AMERICAN MACHINE & FOUNDRY COMPANY, A CORPORATION OF NEW JERSEY

LINED RECEPTACLES

Original application filed July 7, 1919, Serial No. 309,115. Divided and this application filed April 28, 1926. Serial No. 105,108.

This invention relates to making relatively complete receptacles for packaging, storing or shipping commodities; from such materials as sheets or lengths of paper, cardboard, or other sheet material and to a new kind of lined receptacle of this class of advantageous qualifications.

It is increasingly the custom to pack and ship perishables, articles necessarily kept clean, such as food products, and articles which have to be measured in bulk, or protected from the atmosphere, or from which other things have to be protected, in receptacles designed to contain and protect the enclosed material from loss of weight by evaporation, contamination by exposure to the air or from contamination by exposure to the material of the container itself when it is desired that the container shall be of a material affecting in any way the contents. Sometimes the contents contain elements such as moisture or oil reacting upon the container to soil or destroy the same. In all cases, capacity to print labels or trade marks on or to decorate the surfaces of the outer container is of commercial importance.

In any of these situations it is desirable to provide an impervious lining for the container of such materials so treated as to prevent the container from affecting the contents, or the contents affecting the container, and this having been done it is possible to form the exterior container of cheap, strong and serviceable material without reference to its relation to the kind of material intended to be contained in it. Instances of the classes of commodities which have either to be protected from the container or which have to be shipped in a container adapted to be protected from the commodity are familiar to all users of food products in the bulk. For instance, among ground materials, such spices as ginger sift or work out of any but the most impervious containers, and spoil the other packages, or evaporate their volatile flavoring constituents. Coffee evaporates except in an impervious container, and emits such a strong odor as to affect other absorbent foods. Tobacco manufactures and bakery products lose their moisture at a high rate when in a pervious package. Such ready-cooked foods as potato chips and other fried things have some of their retained grease absorbed by an absorbent paper container unless protected. Candies adhere to the container unless protected from it, and then are apt to be torn open by their own weight. Fluids, semi-fluids, jams and pastes obviously require a waterproof lining for the container; butter, cheeses, and other dairy products require a sterile container not absorbent to water or grease.

The above being a well-known state of the art with respect to packages for storage and shipment of such contents, the situation has heretofore been in part met by first making boxes or cartons of strong, stiff paper, pulpboard or pasteboard, and then providing them with a lining or parchmentized, paraffin, rosin-sized or other impervious non-absorbent paper, or metal foil, or foil-coated paper, so that the package comprising the lining responds to the suggested requirements; it has also been proposed to form into a container by simultaneous folding operations a blank of such material as is suitable for the exterior of a package of this nature and an applied lining blank suitable for the interior of such a package.

But so far as I am aware it has heretofore been impossible to provide for sealing the lining, or for completely folding the lining only into an impervious or relatively impervious container, when the operation of making the receptacle as a whole involves operations upon both the lining and the body of the container. When it is desired that the lining should cover unbrokenly the inner surface of the container it has been necessary, according to the prior art practice, first to make the container, then to make the lining, and then to assemble them. This is not only wasteful of time but necessitates the provision of separate receptacle-forming devices, lining-forming devices and assembling devices for putting them together. So far as I am aware, machines for automatically assembling the receptacle and the lining have not been wholly successful or economical because of the difficulty of inserting the flimsy lining into the receptacle without destroying many of the linings. Under the conditions of use, a torn or wrinkled lining prevents utility.

The invention will be described by reference to making complete a lined carton of the kind suitable for the shipment of food products, the lining being formed complete and if desired sealed along side and end closure seams, the carton being formed about the lining while the lining is still supported upon a mandrel or form, and lining and carton being subsequently removed from the mandrel and delivered ready for filling contents into the assembled lined container.

This species of the device of the invention is therefore a carton or box-like receptacle comprising in assembled relation an impervious relatively flexible lining, and a relatively stiff exterior element or cover, glued or otherwise fastened together in finished form, except that box and lining may be open at one end ready for filling and final closure by folding and end-flap fastening operations performed on lining and cover respectively.

In the accompanying drawings,

Fig. 1 is a diagram elevation illustrating a mandrel and a mode of applying a lining blank to form three sides of a tube;

Fig. 2 is a similar elevation showing a tucked-in lap and overlap of a lining blank about to be sealed;

Fig. 3 is a similar elevation illustrating one kind of sealing operation;

Fig. 4 is a perspective of a mandrel carrying a lining tube, the longitudinal seam being fastened;

Fig. 5 is a similar perspective showing end folds of the lining tube partly formed;

Fig. 6 is an end elevation of mandrel and lining tube showing one mode of completing end folding and sealing the end folds of the lining;

Fig. 7 is a perspective of the completed lining;

Fig. 8 is an elevation showing a box or cover blank and one mode of forming the primary and secondary longitudinal folds of the box on and about a mandrel bearing the completed lining;

Fig. 9 is a diagram perspective illustrating one mode of closing and sealing the bottom of the cover or box;

Fig. 10 is a plan view of a blank for a lining showing the relative position of fold lines formed during the operations on it; and Fig. 11 is a plan view of a cut and scored box blank for a cover.

Referring now to Figs. 1 to 7 and 10, the operations may be carried out with the aid of a mandrel 5, which may be any suitable device substantially defining at least five sides of the six-sided three-dimensional space for a receptacle in the form of a rectangular solid, or of any other solid shape suitable to define the interior space in the receptacle to be made. The operation is begun by forming about this mandrel the primary longitudinal folds 2, see Fig. 10, of a blank to constitute a preferably impervious lining for the completed receptacle. Preferably, as shown in Fig. 10, the blank 1 is an oblong piece of suitable sheet material, which may be any of a class of non-absorbent materials, such as cloth or paper suitably treated, any suitable colloid or metallic film, rosin-sized paper or parchmentized paper, or paper uniformly impregnated or coated with a non-absorbent; preferably the lining material is impregnated heavily or coated with a fusible sealing compound or material, preferably containing or consisting of paraffine, a wax, or a resin; but it is within the invention to otherwise treat the lining material or to leave it untreated, and it will be understood that description below of making with or use of a sheet impregnated with or carrying a fusible cementitious material is merely a statement of a preferred species.

As illustrated in Figs. 1, 2 and 3, a preferred way of applying the blank and forming the longitudinal folds in it is to apply an area 3, Fig. 10, near the middle of the blank to one of the narrower faces of the mandrel 5, and then by relative motion of the mandrel and folding devices illustrated in diagram at 4, to fold the remainder of the blank down against the adjacent faces of the mandrel. This operation may be the result of moving the mandrel vertically against a blank 1 lying on a horizontal table having a suitable aperture for passage of the mandrel 5 with cam edges represented by the devices 4 for applying the lateral parts of the blank to the lateral faces of the mandrel.

In the preferred mode, the axis of the mandrel 5 defining its centre of figure remains horizon l, and the mandrel moves upward against the blanks 1 held by gravity and suitable devices 4 on the upper surface of the table over which the blanks 1 may be fed.

In whatever way the blank 1 is applied to the mandrel, and referring now to Fig. 2, secondary folds on the lines 6, 6, Figs. 2 and 10, are now formed one after another against the lower face of the mandrel as illustrated in Figs. 1 and 2. One way of doing this is to act upon the left-hand depending area of the applied blank in the direction of the arrow $a^1$, Fig. 2, by a suitable following tucker, and then to move either the mandrel and blank or a cam-edged presser and sealer device 10, one relatively to the other, in one of the directions indicated by the oppositely pointing arrows $b$ and $c$ so as to apply the exterior lap 7 of the blank 1 over the interior lap 8 of the blank 1. As indicated in Figs. 2 and 3, this may conveniently be accomplished by moving the mandrel and the applied blank in the direction of the arrow $b$ with respect to a cam-ended hot and polished sealing device 10. If the exterior of the flap 8 or the interior of the flap 7 shall have been coated with a suitable adhesive, the device 10 need not be heated; but I prefer to seal the longitudinal seam and the lining bag formed by the above mentioned operations by the action of a hot sealer on a fusible cement.

The lining bag is now completed by forming and sealing end folds, preferably of the type shown in Fig. 5. This may be accomplished, see Fig. 6, by acting on the projecting edge of the tube-folded blank by oscillating or rotary tuckers 12, 12 acting in the direction of the arrows $d$, Fig. 5, to turn in the folds 13, 13, Fig. 5; and then by acting in the direction of the arrow $e$, Figs. 5 and 6, on one of the remaining projections from the tube by suitable folding means such as the folders 15, 15, Fig. 6; these operations may take place during motion of the mandrel and the bag being formed upon it in the direction of the arrow $e$, Figs. 5 and 6. The end folds may then be completed and the bottom closure in the bag sealed by the operation of a relatively stationary cam-edged hot presser 20, Fig. 6, on the remaining fold 14, Fig. 5; or, if a suitable adhesive shall have been applied to a blank with or without any fusible cementitious impregnation, sealing may be effected by a cam presser such as 20, which is not necessarily hot. In any mode of sealing, all of the folds at the end of the mandrel are sealed together into an impervious closure.

The result of the above operations has been to form a longitudinally seamed bag of the kind shown in Fig. 7, both the longitudinal seam and the end fold seams being sealed to complete the bag as an independent receptacle everywhere except at one open end (at the far end of the mandrel 5 as shown in Fig. 4).

It will be observed that a lining bag so made accurately and tightly follows a solid conforming to the faces of the mandrel, and that it is a complete structure, which, if of impervious material, is impervious also at its seams and closure. Although the material of which this lining bag is made may be relatively flimsy and easily torn, nevertheless it is capable, because it fits the mandrel with little or no slack, of bearing considerable stresses without damage while supported on the mandrel; and because of this a relatively stiff box or cover may be formed on and about the bag while it is on the mandrel without damage to the bag, and with the result of causing the bag everywhere to be in substantial contact with the interior surface of the covering box when the box is completed about it, and therefore causing it to be supported by the relatively stiff box against tearing stresses in use. These relations therefore predetermine a completed package in which the lining is independently a continuous and self-seamed receptacle, in exceedingly close contact with the interior of the covering box, and therefore reliably supported everywhere by the covering box to the full extent of the resistance of the covering box to stresses from within or deformation from without.

In order fully to secure the structural advantages mentioned above, a preferred type of box or carton is built about the seamed bag lining in such a way as to cause the necessary longitudinal seam or seams of the box or carton to be out of coincidence with, and preferably on the opposite side of the completed receptacle from the seam or seams of the bag lining. Preferred ways of doing this provide for applying an unbroken section of the box blank to that face of the mandrel-carried bag having a longitudinal seam. Preferably the cover blank C is of the type best shown in Fig. 11 comprising the longitudinal edge scores $c^1$, $c^2$, $c^3$, $c^4$, and the lateral edge scores $c^5$ and $c^6$, these score marks defining a front $c^7$, a back $c^8$, a side $c^9$ and a side $c^{10}$. Continuous with the front $c^7$ a glue-lap or sealing seam flap $c^{11}$ preferably is provided. The end flaps $c^{12}$, $c^{13}$, $c^{14}$, $c^{15}$, are preferably separated by cuts $c^{21}$, and the other end flaps by cuts $c^{22}$ respectively continuing the corner scores $c^2$, $c^3$, $c^4$, but any preferred or desired arrangement of end-closures may be provided for. In some cases the box may have no closure at one end, for instance ending in line $c^6$.

The blank C may be arranged to be integrally folded in square or envelope folds at the bottom as described in connection with lining 1, but preferably the bottom is divided into a front flap $c^{12}$, a back flap $c^{13}$, and side flaps $c^{14}$ and $c^{15}$.

As in the case of the lining, it is preferred to form the primary folds $c^2$, $c^3$ by the proper motion of the mandrel 5 in respect to the table upon which the waiting blank is placed, and by lapping or wrapping the blank about the mandrel. By this arrangement the blank if of some classes of material, need not be scored, or if scored, may never have been bent at the position of the scored lines, and particularly may not, as in the prior art, have been bent through 180° preparatory to lining and filling. Easily broken stock is worked with a success impossible if the steps of manufacture require sharp bending. Blanks like the blank C may therefore be prepared for use by printing on the flat blank all of the desired labels or marks, cutting the slits $c^{21}$ and $c^{22}$ and pre-scoring at the fold lines. Preferably the prepared blanks are stacked and moved in the direction of the slits $c^{21}$ $c^{22}$ into proper relation with a feed table 200, Fig. 8, supporting these blanks for first contact with a bag-carrying mandrel to occur in relation to the area $c^9$ of blank C and that narrower face of the mandrel 5 carrying the seam between the ends of the blank 1. Preferably the box blank is spread with glue at the area $g$ which will overlap the glue-lap $c^{11}$, during passage of the blank to the feed table.

Referring to Fig. 8, passage of the bag-carrying mandrel through a slot in table 200, or other suitable relative movement between the bag-carrying mandrel and any suitable instruments acting like the edges of the slot in the feed table, results in lapping the sides $c^7$, $c^8$ of blank C about the bag on the mandrel by forming sharp bends at the score marks $c^2$, $c^3$; the glue lap $c^{11}$ may now be tucked over the edge of bag and mandrel by a suitable instrument, for example a tucking roller 212 moving in the direction of arrow $f$; and the portion $c^{10}$ of the blank C carrying glue at $g$ may be forced down into contact with glue lap $c^{11}$. For example, the lapping and creasing operations may be carried out in respect to a mandrel 5 moving downward as indicated by arrow $h$ in respect to a slotted feed table 200 and blank C resting on it, the roller 212 acting after this motion; and the portion $c^{10}$ may then be lapped down and the glued seam between it and glue lap $c^{11}$ may be set by motion of the mandrel, bag and box in the direction of arrow $k$ against a cam-edged presser 206, Fig. 8. But any other series of motions or application of instruments to the blank C resulting in bending the blank about the mandrel and the lining 1 carried by it might serve.

Referring now to Fig. 9, the receptacle may be completed by any suitable order of bottom sealing operations carried out upon the projecting flaps $c^{12}$, $c^{13}$, $c^{14}$, $c^{15}$; for example the flaps $c^{14}$, $c^{15}$ may be tucked in against the bottom closure of the bag 1; the flap $c^{12}$ may be spread with glue on both faces, at the area $g^2$, bent in against flaps $c^{14}$ and $c^{15}$, and the fourth flap $c^{13}$ may be turned in and pressed against flap $c^{12}$. Bottom sealing means of ordinary construction suitable for paper boxes or cartons having cut flaps is suitable, but I prefer to operate on the cut flaps to turn them in as indicated by arrows $w$, $x$, $y$ and $z$ in the order mentioned, and then to press the outside flap $c^{13}$ in the direction of the axis of mandrel 5.

The glued area $g$ is exposed for contact with the bag along a narrow longitudinal line, and the glued area $g^2$ is exposed for contact with the end of bag 1 in the space between flaps $c^{14}$ and $c^{15}$, when the parts are proportioned as shown and this glued attachment of box to bag additionally holds the bag in contact with the box, although this is ordinarily sufficiently assured by the close fit of the box, air pressure on attempted relative movement, and friction.

The mandrel 5 may be hollow and perforated, and the lined box may be delivered from the mandrel by air pressure acting from within the mandrel.

The completed receptacle is open at one end. After filling with the proposed contents, the lining bag may be folded upon the contents, sealed if desired, and the flaps of the end closure of the box folded over and sealed in due order. These operations may be competently performed by known top-sealing devices working in connection with known types of packaging machinery. Or, in accordance with the operation of well known top sealers, the narrower side flaps of the box and primary folds of the bag may be turned in together, the upstanding triangular fold of the bag and one of the wider side flaps may then be spread with glue or other adhesive, and the box sealed by turning in the glued flap on the unglued fourth flap.

This application is a division of my application filed July 7, 1919, Serial No. 309,115; Patent No. 1,584,964, May 18, 1926.

The novel receptacle disclosed herein is claimed in my copending application Serial No. 534,193, filed May 1, 1931, which is a division of this application.

I claim:

1. Art of making lined receptacles comprising wrapping and fastening together about a mandrel or form a blank for a lining of suitable material to make a bag; making a box to support and protect the bag in use by bending and sealing a flat blank of suitable stiff material on and about the bag and mandrel; and thereafter removing the bag and box from the mandrel.

2. Art of making lined receptacles comprising applying a relatively flexible lining to a mandrel or form defining the useful space in the receptacle, fastening the material together at overlaps to make a bag; applying and folding a relatively stiff flat cover about the mandrel and the bag, and then removing from the mandrel the completed lined receptacle.

3. Art of making lined receptacles comprising applying a relatively flexible lining comprising a fusible cementitious substance to a mandrel or form defining the useful space in the receptacle, fastening the material together at overlaps to make a bag by fusion of the cementitious substance; applying and forming a relatively stiff cover about the mandrel and the bag, and then removing from the mandrel the completed lined receptacle.

4. Art of making lined receptacles comprising applying a blank of lining material to a mandrel or form, completing a lining by securing together about the mandrel overlaps of the lining material; applying by folding about the completed lining while supported by the mandrel a flat cover of relatively stiff material substantially everywhere in contact with the lining, and removing cover and lining from the mandrel.

5. Art of making lined receptacles comprising applying a blank of lining material to a mandrel or form by bending and folding the blank to enwrap the mandrel, completing a lining by securing together about the mandrel overlaps of the lining material; folding about the completed lining while supported by the mandrel a flat cover of relatively stiff material substantially everywhere in contact with the lining, fastening together overlaps of the cover and removing cover and lining from the mandrel.

6. Art of making lined receptacles comprising forming a bag on and about a mandrel by wrapping and sealing with the aid of heat a flexible bag-blank of impervious material impregnated with a fusible impregnant, applying a stiff cover blank projecting beyond one end of the mandrel, turning in and fastening the projecting portion for a bottom closure, and removing the lined receptacle from the mandrel.

7. Art of making lined receptacles comprising forming a bag on and about a mandrel by wrapping and sealing with the aid of heat a flexible bag-blank of impervious material impregnated with a fusible impregnant, applying a stiff cover blank having cut end-flaps, sealing the end-flaps to close the cover, and removing the lined receptacle from the mandrel.

8. Art of making lined receptacles comprising forming a bag on and about a mandrel by wrapping and sealing a flexible flat bag-blank projecting beyond one end of the mandrel, turning in and fastening the projecting portion for a bottom closure, applying a stiff cover, and removing the lined receptacle from the mandrel.

9. Art of making lined receptacles comprising forming and sealing the seams of a lining bag on and about a mandrel or form, applying a cut-out scored stiff cover blank to the mandrel or form and the bag carried by it in such relation as to present an unbroken area of the cover blank to a face of the mandrel or form bearing a seam of the bag, fastening together overlaps of the cover blank to form a stiff box in supporting contact with the bag substantially throughout the interior surface of the box, and removing the completed receptacle from the mandrel or form.

10. Art of making lined receptacles with the aid of a mandrel comprising folding a blank of lining material about the mandrel to overlap on one of its faces, sealing this overlap to form a seam; folding a bottom closure and sealing the overlaps of said closure; applying to the mandrel-supported lining a stiff cover blank having glued areas adapted to overlap other portions of the blank for sealing a longitudinal seam and an end closure, and pressing said cover to complete adhesion of said seam and end closure.

11. Art of making lined receptacles with the aid of a mandrel comprising folding a blank of lining material about the mandrel to overlap on one of its faces, sealing this overlap to form a seam; folding a bottom closure and sealing the overlaps of said closure; applying to the mandrel-supported lining a stiff cover blank having glued areas adapted to overlap and extend beyond other portions of the blank for sealing a longitudinal seam and an end closure, and pressing said cover against the enclosed bag to complete adhesion of said seam and end closure and cause adhesion together of bag and cover at an area on one side of the completed package.

Signed by me at Boston, Massachusetts, this 26th day of April, 1926.

CHARLES P. WELLMAN.

CERTIFICATE OF CORRECTION.

Patent No. 1,882,049.  October 11, 1932.

CHARLES P. WELLMAN.

It is hereby certified that error appears in the printed specification of the above numbered patent requiring correction as follows: In the grant and in the heading to the printed specification, title of invention, for "Lined Receptacles" read Art of Making Lined Receptacles; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.